United States Patent
Wilhelm et al.

(10) Patent No.: US 8,448,911 B2
(45) Date of Patent: May 28, 2013

(54) RAIL ARRANGEMENT FOR GUIDING A FITTING INSIDE GUIDING RAILS PARTICULARLY IN AIRCRAFTS

(75) Inventors: Arne Wilhelm, Schwiederstorf (DE); Markus Fritz, Hamburg (DE)

(73) Assignee: Airbus Operations GmbH (DE)

( * ) Notice: Subject to any disclaimer, the term of this patent is extended or adjusted under 35 U.S.C. 154(b) by 201 days.

(21) Appl. No.: 12/490,476

(22) Filed: Jun. 24, 2009

(65) Prior Publication Data

US 2009/0321606 A1  Dec. 31, 2009

Related U.S. Application Data

(60) Provisional application No. 61/133,479, filed on Jun. 30, 2008.

(30) Foreign Application Priority Data

Jun. 30, 2008  (DE) .......................... 10 2008 031 022

(51) Int. Cl.
*F16M 13/00*  (2006.01)

(52) U.S. Cl.
USPC .......................... 248/429; 248/298.1; 248/500

(58) Field of Classification Search
USPC .......................... 248/430, 424, 429, 500, 298.1
See application file for complete search history.

(56) References Cited

U.S. PATENT DOCUMENTS

| | | | |
|---|---|---|---|
| 3,012,695 A * | 12/1961 | Lerner | 222/129 |
| 3,926,397 A * | 12/1975 | Hunwicks | 248/430 |
| 4,533,107 A * | 8/1985 | Okazaki et al. | 248/430 |
| 4,649,622 A * | 3/1987 | Scott | 483/29 |
| 5,046,698 A * | 9/1991 | Venier | 248/430 |
| 5,207,473 A * | 5/1993 | Nawa et al. | 296/65.15 |
| 5,213,300 A * | 5/1993 | Rees | 248/429 |
| 5,332,183 A * | 7/1994 | Kagayama | 248/222.13 |
| 6,105,920 A * | 8/2000 | Gauger | 248/429 |
| 6,676,099 B2 * | 1/2004 | Mallard et al. | 248/429 |
| 7,100,885 B2 | 9/2006 | Zerner et al. | |
| 7,207,756 B2 | 4/2007 | Vichniakov et al. | |
| 7,309,107 B2 * | 12/2007 | Smith et al. | 297/344.11 |
| 2002/0084683 A1 * | 7/2002 | Christopher | 297/344.11 |
| 2004/0118990 A1 * | 6/2004 | Yokoi et al. | 248/424 |

FOREIGN PATENT DOCUMENTS

| | | |
|---|---|---|
| DE | 4333552 | 4/1995 |
| DE | 10360807 | 9/2005 |
| EP | 0685358 | 12/1995 |
| EP | 1544105 | 6/2005 |
| WO | 9925601 | 5/1999 |

* cited by examiner

*Primary Examiner* — Amy J Sterling
(74) *Attorney, Agent, or Firm* — Lerner, David, Littenberg, Krumholz & Mentlik, LLP

(57) ABSTRACT

The invention relates to a rail arrangement for coupling a displaceable element to a support structure, wherein the rail arrangement comprises a guiding rail and a fitting. In this arrangement the fitting is connectable to the displaceable element, and the guiding rail is connectable to the support structure. The fitting is arranged in the guiding rail in such a way that the fitting can be displaced in longitudinal direction of the guiding rail; wherein the guiding rail is formed as an open-top hollow profile with a rail base. In this arrangement the rail base comprises at least one elevation that extends upwards (i.e. towards the open-top). The fitting comprises a bottom surface which in longitudinal direction is interrupted by a continuous groove, wherein the form of the groove of the fitting is designed in such a way that the fitting is guided by the elevation along the guiding rail.

12 Claims, 4 Drawing Sheets

RAIL ARRANGEMENT FOR GUIDING A FITTING INSIDE GUIDING RAILS PARTICULARLY IN AIRCRAFTS

CROSS-REFERENCE TO RELATED APPLICATIONS

This application claims the benefit of the filing date of U.S. Provisional Patent Application No. 61/133,479 filed Jun. 30, 2008, the disclosure of which is hereby incorporated herein by reference.

BACKGROUND OF THE INVENTION

The present invention relates to a rail arrangement for guiding fittings inside guiding rails, particularly in aircraft, as well as to an aircraft comprising such a rail arrangement.

In most commercial aircraft the seat rows for passengers are arranged in the fuselage in such a way that the passengers are seated in the direction of flight, wherein the individual seat rows extend transversely to the direction of flight, and wherein several seat rows are arranged one behind the other in the direction of the longitudinal axis of the aircraft. Seat rows comprising two or three seats side-by-side are the norm. In larger aircraft, which most of the time can also comprise wider fuselages, in the meantime seats may also be installed in the middle along the longitudinal axis of the aircraft.

As a rule, seat rows are taken together to form groups or classes. There are usually two or three classes, which among other things may differ by a different seat pitch. In order to meet the interests of aircraft operators to convey as many passengers as possible, the seat pitch in aircraft can be adapted to the planned applications and to passenger numbers. For example, in economy class the seat pitch is shorter in the case of short flight distances than it is in long ones. In so-called holiday-travel aircraft, some aircraft, for example, have no business class and no first class, and consequently the seat pitch is the same throughout.

In order to optimally adapt the seat rows, as far as their number and their pitch are concerned, to the requirements of aircraft operators, as a rule the seat rows are held in rails. The seat rows can thus be placed in the rails and can, at least at predetermined spacing, be affixed along the longitudinal axis of the aircraft.

From the documents EP 1 544 105 A1, also published under U.S. Pat. No. 7,207,756 B2, and DE 103 60 807 A1, also published under U.S. Pat. No. 7,100,885 B2, for example seat rails are known that essentially comprise a C-shaped profile. This profile, which is rigidly connected to the fuselage floor, is open, in the form of a groove, towards the ceiling of the passenger cabin. In this arrangement the groove comprises widened regions at regular spacing so that a seat row can not just be threaded into the rail at the beginning or end of said rail, but can be threaded-in wherever these widened regions are present. In order to displace the seat rows, the affixation of the sliding pieces or fittings running in the rail are undone. Thereafter, the seat row is pushed to the intended position and is affixed anew.

However, it has been shown that as a result of dirt deposited in the rails the resistance during displacement of seat rows may increase over time. Such dirt may predominantly be food residues which together with drink containing sugar may form a very sticky deposit on the rail. Furthermore, this dirt may reach the area between the bottom of the profile and the fitting that slides on it. This in turn may increase friction resistance and, furthermore, may damage the rail and/or the fitting. In order to manually displace such a seat row, which as a rule is arranged on two rails that extend parallel to each other and are spaced apart from each other, an operator may need to apply more force than would be the case with a clean rail. Furthermore, the increased application of force and the irregular detachment of dirt may lead to a situation in which the seat row moves unevenly within each of its rails. This may result in canting or at times even in jamming of the fittings in the rails, in particular in the area of the widened regions in the rail profile.

BRIEF SUMMARY OF THE INVENTION

According to an exemplary embodiment of the invention a rail arrangement for coupling a displaceable element to a bearer structure is provided, wherein the rail arrangement comprises a guiding rail and a fitting. In this arrangement the fitting is connectable to the displaceable element, and the guiding rail is connectable to the support structure. The fitting is arranged in the guiding rail in such a way that the fitting can be displaced in longitudinal direction of the guiding rail, wherein the guiding rail is formed as an open-top hollow profile with a rail base. In this arrangement the rail base comprises at least one elevation that extends upwards (i.e. towards the open-top). The fitting comprises a bottom surface which in longitudinal direction is interrupted by a continuous groove, wherein the form of the groove of the fitting is designed in such a way that the fitting is guided by the elevation along the guiding rail.

As a result of the groove in the fitting, in conjunction with the elevation from the rail base, the fitting is guided in such a way that it need not be guided by sidewalls of the hollow profile. It may thus be ensured that the fitting does not cant during displacement of the displaceable element. This may ensure unproblematic and fast displacement of the fitting in the guiding rail.

This may make possible simple and quick displacement of the fitting within the rail in its longitudinal direction.

With the fittings the displaceable elements may be detachably connected, for example by means of screw connections. The term "displaceable elements" predominantly refers to seat rows. However, other types of elements, for example partitions or shelves, are also possible.

A rail arrangement designed for use in a vehicle or aircraft may, for example, comprise at least two rails that extend parallel to each other and that are spaced apart from each other. These rails are connected to a support structure, wherein the term "support structure" usually refers to the floor into which the forces that are experienced are introduced. The forces are composed of the intrinsic weight of the displaceable element and any additional load, if applicable in connection with the acceleration or deceleration forces acting on the element.

The elevations may be arranged along the guiding rail, for example, as stated in detail further below, as a continuous bead that projects upwards from the rail base.

As an alternative several elevations may be arranged separately, one behind the other, in a row. In this arrangement the elevations may comprise a constant space from each other. The centres of two adjacent elevations drop down at least nearly to the rail base. The elevation may comprise an angular and/or a curved horizontal projection. To make it possible for the elevation to carry out its guiding function relative to the fitting, during displacement said fitting may engage at least two elevations.

The rails used in the rail arrangement may comprise guiding rails. Thus the bases of the rails comprise at least one elevation. In this way, for example, seat rows are then guided on each side with the use of the corresponding fittings.

If the displaceable elements themselves are correspondingly stable, one-sided guiding may result in excessive rigidity of the system that comprises this very rail arrangement and the fittings with the displaceable element. Consequently, guidance may then be handled by a single guiding rail in conjunction with the corresponding fitting. The at least one other rail can then be replaced by a rail that is known from the state of the art.

In another embodiment of the invention the hollow profile of the rail arrangement is arranged in such a way that the rail base extends so as to be essentially horizontal. This arrangement of the hollow profile, which can be designed either as a rail or as a guiding rail, may make it possible to easily insert into the rails the movable elements with the fittings installed on said movable elements. Furthermore, the movable elements can quickly be removed from the rails. This may be of great advantage especially with a view to time-consuming configuration of, for example, passenger cabins in aircraft. Furthermore, a floor that can be walked upon can be placed onto the support structure, which floor can be designed so that the top of the floor extends so as to be flush with the rail. This avoids the creation of an uneven area between the floor and the hollow profile, which uneven area may otherwise cause people to trip over.

In another embodiment of the invention the groove in the bottom surface of the fitting comprises a groove base, and the elevation of the guiding rail comprises a top, wherein during displacement of the fitting the groove base slides along the top. This may result in a defined sliding surface between the guiding rail and the fitting, namely the groove base of the fitting and the top of the elevation. Since parts that slide on each other may require special surface characteristics, for example roughness or dimensional accuracy, only these regions need to be processed correspondingly. This can save time during fabrication. Furthermore, by predetermining the sliding region it becomes easy to calculate the surface pressure that is encountered between the fitting installed on the displaceable element and the elevation of the guiding rail. Due to the surface pressure determined, the shape between the fitting and the guiding rail can be designed so that it is optimal.

In a further embodiment of the invention the groove of the fitting is shaped in such a way that the cross section of the groove essentially conforms to the cross section of the elevation of the guiding rail. Such a shape of the groove and of the elevation may ensure that contact between the groove and the elevation does not take place in a line shape or point shape but instead in an area shape. The cross section of the groove may need be selected such that the groove in the fitting can slide over the elevation. In this way the fitting can be slid along in the guiding rail without any canting or jamming. Thus, the cross section of the groove may be selected so as to be slightly larger than the cross section of the elevation at its highest point. Thus the cross section of the groove and the cross section of the elevation essentially conform to each other. As a rule, the clearance between the fitting and the elevation should be just sufficient for the guiding function of the fitting in the guiding rail to be ensured. The manufacturing tolerances of the fitting, in particular of the groove of the fitting, and of the guiding rail, in particular of the elevation of the guiding rail, are to be selected according to corresponding specifications.

In an advantageous manner, the elevation comprises a vertex. The cross section of the elevation of the guiding rail can thus, for example, be designed so as to be parabolic, circular or ellipsoid, or it can be designed so as to be triangular. In particular if the displaceable elements are designed as seat rows, dirt that falls down, for example in the form of dropped food residues, spilled drinks, or grit that originates from the profiles of passengers' shoes, can thus slide from the elevation to the rail base. Thus the sliding surfaces, namely the groove base of the fitting and the elevation of the guiding rail, remain free of dirt. In particular grit, if it were to find its way between the sliding surfaces, during the process of displacement may create permanent damage in the form of scoring marks, both in the groove of the fitting and in the elevation of the guiding rail. During renewed displacement of the displaceable elements, the damaged sliding surfaces may generate considerably higher resistance, which would have to be compensated for by the person manually sliding the displaceable elements exerting more force. Furthermore, the extent of damage may be such that the fitting would have to be replaced. Any replacement of the guiding rail may be extremely labour-intensive.

The bottom surface of the fitting may be designed so that there is a gap between the bottom surface and the rail base. Thus any dirt that slides from the elevation to the rail base can remain on the rail base when the displaceable elements are displaced. The fitting quasi drives over the dirt without having to remove it. Any additional removal of the dirt sticking to the rail base may require greater force to be applied by the person carrying out the displacement process.

In a further embodiment of the invention, the gap between the bottom surface of the fitting and the rail base of the guiding rail comprises a height of at least one millimeter. In this way even grit of a small grain size, which grit has been deposited on the rail base, may simply be driven over. Even if the grain size of the grit is larger than the gap, and if during the displacement process the grit is not pushed along ahead of the fitting but is driven over by the fitting, damage occurs at locations at which no sliding movement takes place. Thus, damage of the bottom surface of the fitting and/or of the rail base of the guiding rail may not result in increased resistance during a following (renewed) displacement procedure.

The elevations of the guiding rail may be connected to form a continuous bead. While a continuous bead reduces the space in which dirt can lodge, it may also enlarge the support surface of the groove base of the fitting. Since the fitting now rests along the entire length of the groove base against the bead, the surface pressure is reduced when compared with resting against elevations. Thus it may also be possible to use a softer material in the production of the guiding rail; without this resulting in damage to the guiding rail due to excessive surface pressure.

The design of the guiding rail may not require the bead to extend along the middle of the rail base. The bead may also extend off-centre. However, as a rule, the bead extends parallel to the groove-shaped opening that opens the hollow profile.

The bead of the guiding rail may extend along the entire length of the guiding rail. This continuous bead along the entire length of the guiding rail may make it possible to keep the production process simpler and thus more economical. If the guiding rail is, for example, made of aluminium, the guiding rail can be produced in an extrusion moulding process.

In another exemplary embodiment of the invention the bead, the rail base and/or the bottom surface with the groove of the fitting comprise/comprises a friction-reducing surface. Firstly, a friction-reducing surface may make it possible for the force exerted for displacing the displaceable elements to be less when compared to a surface that is not designed so as to be friction-reducing. Moreover, such a surface may reduce the adhesion forces of the dirt. In order to be able to manually displace a displaceable element, it may become necessary to remove from the rail base the dirt that has been collected in the guiding rail, in particular if an excessive amount of dirt has lodged in the guiding rail and said dirt cannot be driven over by the fitting. In such a case the surface mentioned prevents a situation in which for manual displacement of the displaceable elements an operator has to exert increased force.

Any reduction in the adhesive forces between the dirt and the friction-reducing surface has a particularly advantageous effect in the case of drinks containing a lot of sugar, for example lemonade, because any sugar of such drinks that has crystallised out between the elevation or the bead of the guiding rail and the groove of the fitting, in the absence of a friction-reducing surface can quasi result in sticking of the fitting to the guiding rail. In order to subsequently design the fitting so that it is displaceable relative to the guiding rail, an additional, avoidable, work step would have to be carried out.

In order to bring about a reduction in friction and a reduction in the adhesive forces, the rail base with the bead or with the elevation of the guiding rail, as well as the groove base, and in addition the bottom surface of the fitting, can, for example, be coated with PTFE or PVDF. Furthermore, it is possible to significantly increase the surface hardness of the material, e.g. aluminium, from which the guiding rails are made, for example by hard-anodising. In addition, such a coating is associated with an advantage in that the pores that have arisen can be closed in a Teflon application method. The bottom surface of the fitting with the groove, which fitting as a rule is made from steel, can in a friction-reducing way comprise, for example, a chromium coating which can also subsequently be given a Teflon coating.

According to the invention, an aircraft is equipped in such a way as to accommodate a rail arrangement according to the above description.

Further details and advantages of the invention are provided in the following description of exemplary embodiments, which are explained in detail with reference to the drawings.

DETAILED DESCRIPTION

Figure 1:
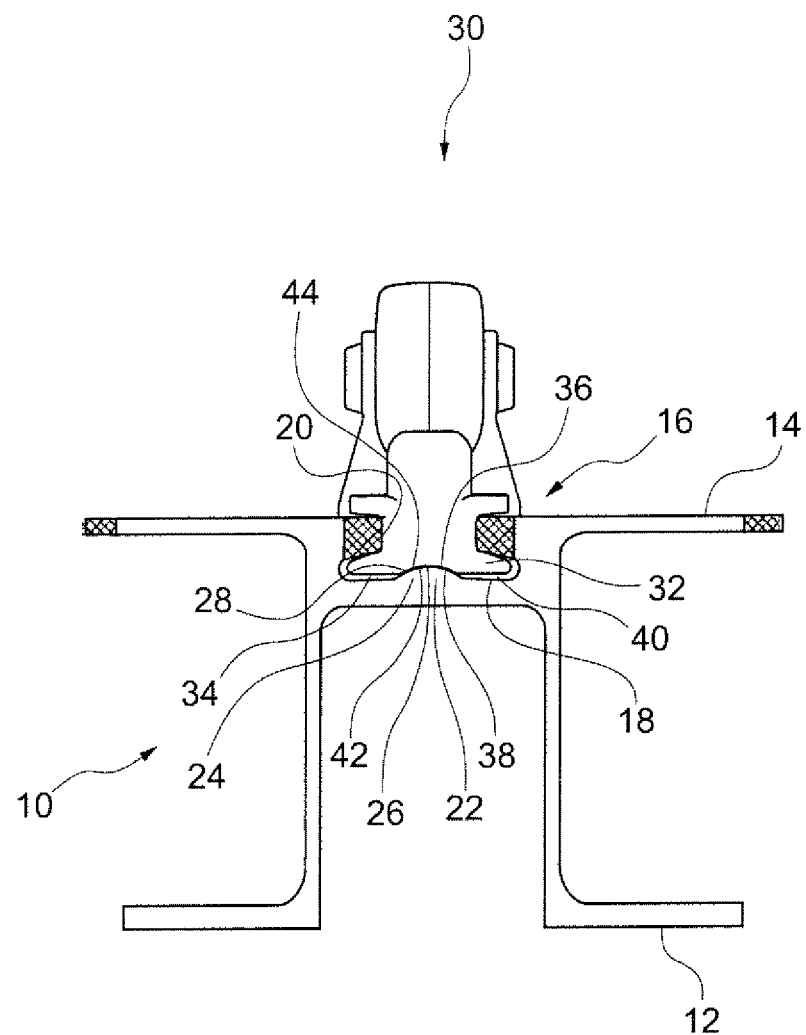
FIG. 1 shows a cross section of a rail arrangement according to an exemplary embodiment of the invention.

Identical or similar components in different figures have the same reference characters. The illustrations in the figures are diagrammatic and not to scale.

FIG. 1 shows a cross section of a rail arrangement according to an exemplary embodiment of the invention with a guiding rail 10 and a fitting 30. The guiding rail 10 comprises a bottom 12 that is rigidly connected to a support structure (not shown in the diagram). Opposite the bottom 12 of the guiding rail 10 there is the top 14. At its middle, the top 14 of the guiding rail 10 is interrupted by a hollow profile 16. The hollow profile 16 extends so as to be flush with the top 14 of the guiding rail 10. There are thus no projections on the top 14 through the hollow profile 16. The bottom of the hollow profile 16 is formed by a rail base 18. In the middle along the guiding rail 10 the hollow profile 16 is open towards the top 14 by a groove-shaped opening 20. In the middle of the rail base 18 and along the guiding rail 10 an elevation 22 or bead 24 extends that points towards the top 14. The elevation 22 is designed as a segment of a circle, wherein the segment of a circle forms a highest point, namely a vertex 26. At its surface the elevation 22 forms a top 28 which at the same time serves as a sliding surface for the fitting 30.

The fitting 30 is connected to a displaceable element (not shown in the diagram) On one face the fitting 30 forms a bottom 32 which is displaceable in the hollow profile 16 along the guiding rail 10. On the bottom 32, a bottom surface 34 is formed on the face that is parallel to the bottom 12 of the guiding rail 10. The length of the bottom surface 34 is interrupted by a groove 36. At its top the groove 36 forms a groove base 38. The cross-sectional shape of the groove 36 essentially corresponds to the cross-sectional shape of the elevation 22. When the fitting 30 is displaced, the groove base 38 slides over the top 28 of the elevation 22. To allow the groove base 38 to slide over the top 28 of the elevation 22, the groove base 38 must not jam against the top 28. For this purpose the cross-sectional shape of the groove 36 is slightly larger in order to prevent any such jamming. The cross-sectional shapes are designed in such a way that between the top 28 and the groove base 38 neither line-shaped nor point-shaped contact but instead area-shaped contact is established.

The bottom surface 34 extends parallel to the rail base 18, but when the fitting 30 is displaced in the guiding rail 10 it forms a gap 40, 1.5 mm in height, between the bottom surface 34 and the rail base 18. In order to reduce friction between the top 28 of the elevation 22 and the groove base 38 of the groove 36, the top 28 comprises a friction reducing surface 42 while the groove base 38 comprises a friction-reducing surface 44.

Figure 2:
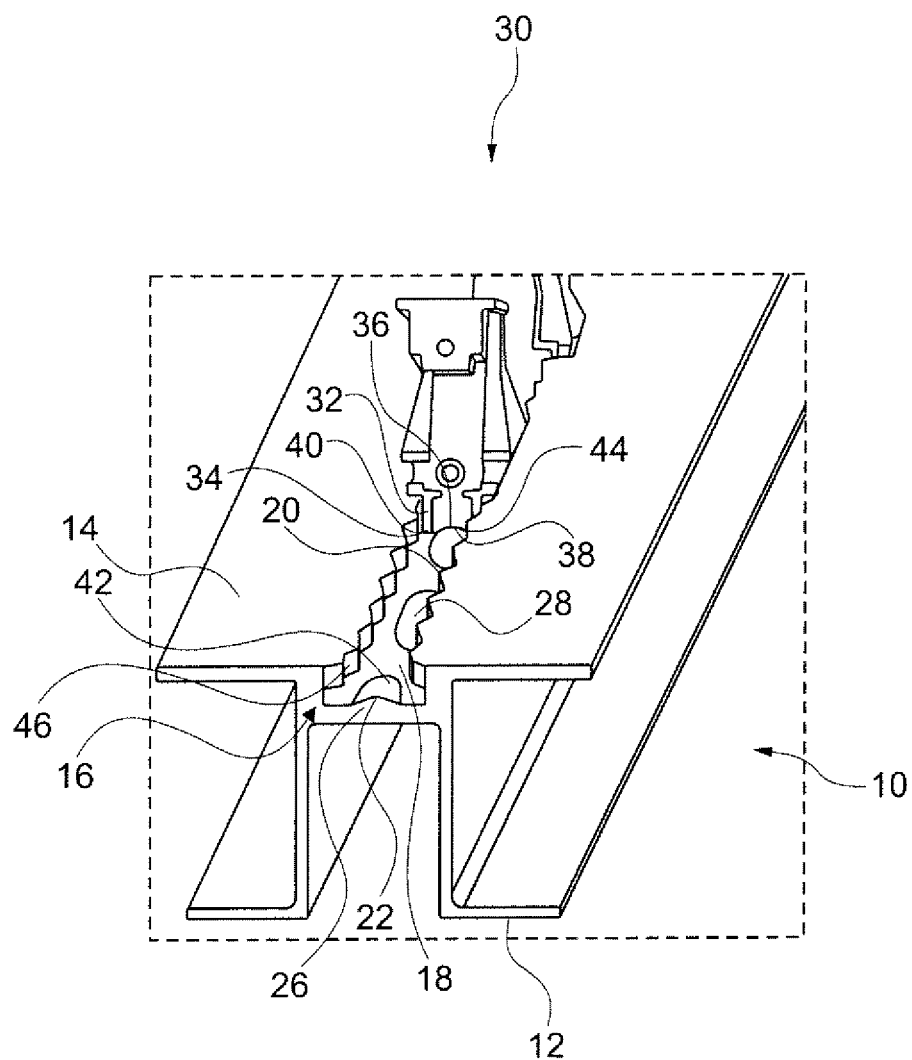
FIG. 2 shows a perspective view of an embodiment of a rail arrangement.

FIG. 2 shows a perspective view of an embodiment of a rail arrangement according to an exemplary embodiment of the invention. The elevations 22 are clearly shown. Whenever the fitting 30 is displaced in the guiding rail 10, always at least two elevations 22 engage the groove 36 of the fitting. By means of the elevations 22 the fitting 30 is guided within the hollow profile 16.

During manual displacement of the fitting 10, at the height of the gap 40 the bottom surface 34 stands back from the rail base 18. On the one hand this may ensure that the groove base 38 of the fitting 30 glides along the top 28 of the elevation 22. This may make possible precise guidance of the fitting 30. On the other hand any dirt that has accumulated on the rail base 18 is quasi driven over. As a result of the vertex 26 and the circular shape of the elevation 22 no dirt remains lodged on the elevation 22 but instead slides to the rail base 18.

Providing friction-reducing surfaces 42, 44 may on the one hand result in a reduction in the need to apply force when displacing the fittings 30. On the other hand such surfaces, in particular when friction reduction is achieved with the use of PTFE or PVDF, may prevent adhesion of dirt on these surfaces. Thus in this exemplary embodiment it is not only the groove base 36 with the associated elevation 22 that comprises such friction reducing surfaces, but in addition also the rail base 18 and the bottom surface 34. Thus even sugar that has crystallised out of sugar-containing drinks, for example lemonades, cannot result in the guiding rail 10 and the fitting 30 sticking together.

Across the alignment of the guiding rail 10, the groove-shaped opening 20 comprises widened regions 46 that extend so as to be perpendicular to the rail base 18. The distance between two adjacent widened regions is typically 25.4 mm, in other words one inch, with said space being constant along the length of the guiding rail 10. The bottom part 32 of the fitting 30 is formed such that on the one hand its length covers at least two widened regions 46, and on the other hand that the bottom 32 can be inserted through these widened regions 46 into the guiding rail 10. In order to affix the fitting 30 in the guiding rail 10, on the one hand a pin (not shown in the diagram) is inserted in a widened region 46. This pin thus prevents any longitudinal movement of the fitting 30 in the rail 10, and positions the bottom part 32 in relation to the widened regions 46 in such a way that the bottom part 32 cannot be removed from the guiding rail 10. On the other hand, the still possible but minimal vertical movement of the fitting 30 is prevented in that the top 14 of the fitting 30 is wedged together with the guiding rail 10. As a result of this, the fitting 30 is lightly lifted to the guiding rail 10 so that the fitting 30 no longer engages the elevations 22.

As a result of the elevations 22 the fitting 30 is guided in such a way that canting of the fitting 30 in the hollow profile 16, in particular in the widened regions 46, is largely excluded.

Figure 3:
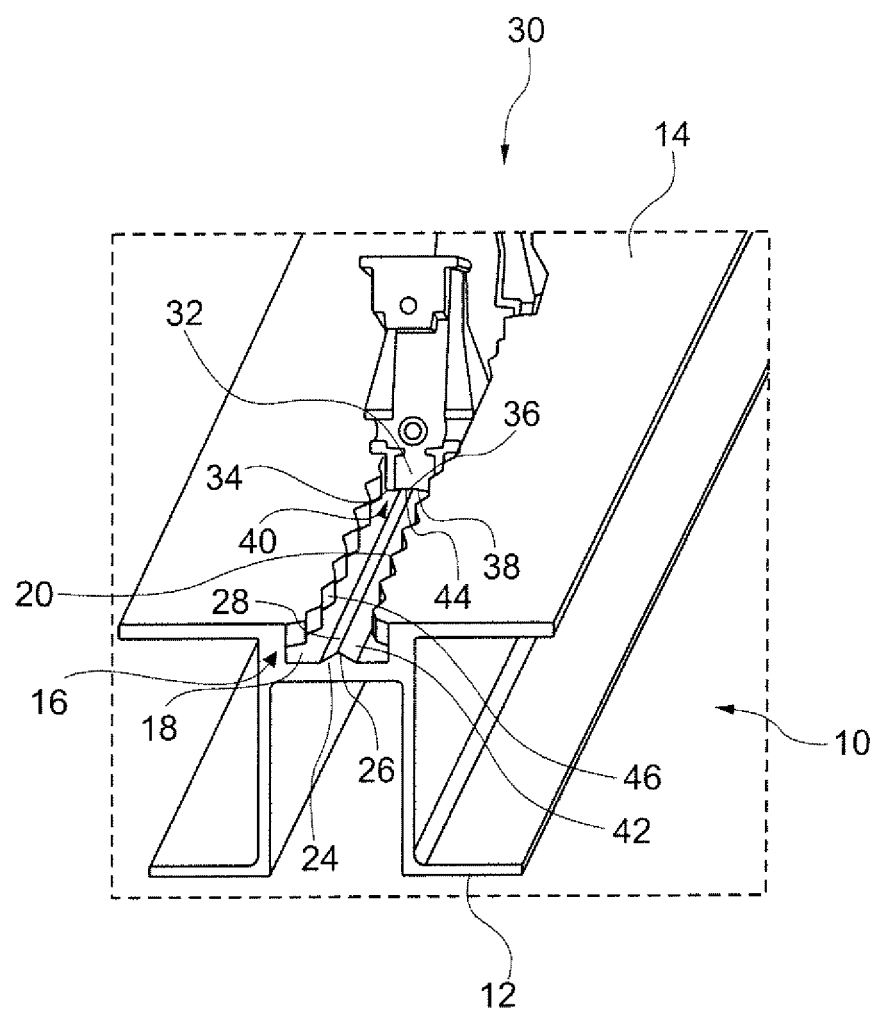
FIG. 3 shows a perspective view of a further embodiment of a rail arrangement.

FIG. 3 shows a perspective view of a further embodiment of a rail arrangement according to an exemplary embodiment of the invention. This exemplary embodiment differs from that shown in FIG. 2 only in that the elevations 22 from FIG. 2 are connected to form a continuous bead 24. The highest point, designated the vertex 26, on the bead manifestly forms a line that is parallel to the rail base. The function is analogous to that of FIG. 2.

Figure 4:
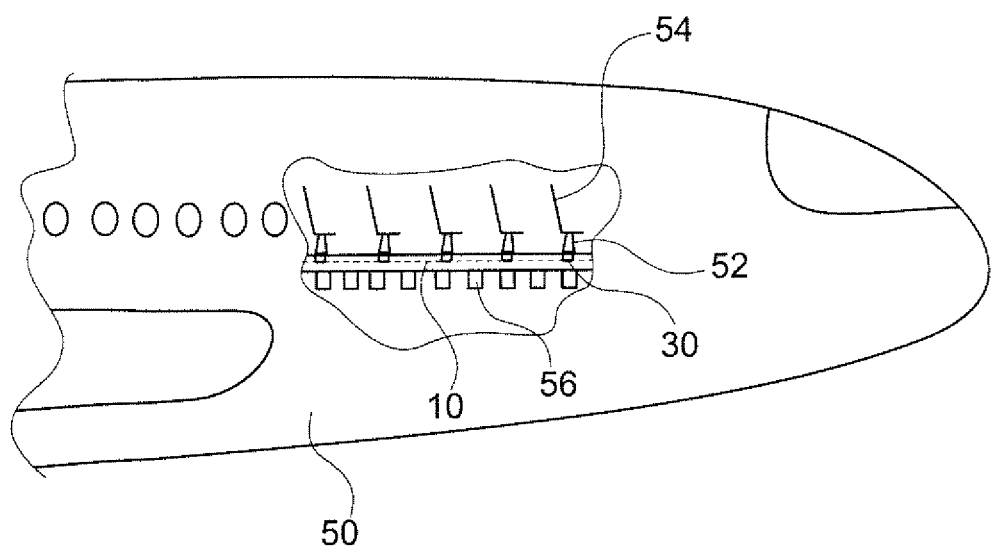
FIG. 4 shows an aircraft comprising the seat rail arrangement according to an exemplary embodiment of the invention.

FIG. 4 shows an aircraft 50 comprising the seat rail arrangement according to an exemplary embodiment of the invention. In order to provide clarity the vertical projection of the passenger cabin does not show any frame elements or stringers. The fittings 30 are connected to mounting frames 52 that hold seat rows 54. The fittings 30 in turn slide in the guiding rails 10 that are rigidly connected to the support structure 56. Guiding a mounting frame 52 requires at least two opposite fittings 30, wherein each fitting 30 slides in a guiding rail 10. Thus, guiding a mounting frame 52 requires at least two guiding rails 10 that extend parallel to each other and that are spaced apart from each other.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

10 Guiding rail
12 Bottom
14 Top
16 Hollow profile
18 Rail base
20 Opening
22 Elevation
24 Bead
26 Vertex
28 Top
30 Fitting
32 Bottom part
34 Bottom surface
36 Groove
38 Groove base
40 Gap
42 Friction-reducing surface
44 Friction-reducing surface
46 Widening
50 Aircraft
52 Mounting frame
54 Seat row
56 Support structure

The invention claimed is:

1. A rail arrangement for coupling in an aircraft a displaceable element to a support structure, wherein the rail arrangement comprises:
   a guiding rail and
   a fitting adapted for being connected to the displaceable element;
   wherein the guiding rail is connected to the support structure;
   wherein the fitting is arranged in the guiding rail in such a way that the fitting can be displaced in a longitudinal direction of the guiding rail;
   wherein the guiding rail is formed as an open-top hollow profile with a rail base;
   at least one elevation formed in the rail base, the elevation extending towards the open-top;
   wherein the fitting comprises a bottom surface which in a longitudinal direction is interrupted by a continuous groove configured such that the fitting is guided by the elevation along the guiding rail, the elevation extending into the groove;
   wherein the groove comprises a groove base, and the elevation comprises a top, wherein during displacement of the fitting the groove base slides along the top, the fitting borne by the top of the elevation so as to receive a weight of the fitting from above and
   wherein the groove of the fitting is shaped in such a way that the cross section of the groove essentially corresponds to the cross section of the elevation and wherein the bottom surface of the fitting is configured so that there is a gap between the bottom surface of the rail base.

2. The rail arrangement of claim 1, wherein the hollow profile is arranged such that the rail base extends essentially horizontally.

3. The rail arrangement of claim 1, wherein the elevation comprises a vertex.

4. The rail arrangement of claim 1, wherein the gap has a height of at least one millimeter.

5. The rail arrangement of claim 1, wherein the elevations are connected to form a continuous bead.

6. The rail arrangement of claim 5, wherein the bead extends along the entire length of the guiding rail.

7. The rail arrangement of claim 1, wherein at least one of the rail base and the bottom surface with the groove of the fitting comprises a friction-reducing surface.

8. An aircraft comprising a rail arrangement for coupling a displaceable element to a support structure, wherein the rail arrangement comprises:
   a guiding rail and
   a fitting adapted for being connected to the displaceable element;
   wherein the guiding rail is connected to the support structure;
   wherein the fitting is arranged in the guiding rail in such a way that the fitting can be displaced in longitudinal direction of the guiding rail;
   wherein the guiding rail is formed as an open-top hollow profile with a rail base;

at least one elevation formed in the rail base, the elevation extending towards the open-top;

wherein the fitting comprises a bottom surface which in longitudinal direction is interrupted by a continuous groove;

wherein the form of the groove of the fitting is designed in such a way that the fitting is guided by the elevation along the guiding rail, the elevation extending into the groove;

wherein the groove comprises a groove base, and the elevation comprises a top, wherein during displacement of the fitting the groove base slides along the top, the fitting borne by the top of the elevation so as to receive a weight of the fitting from above and wherein the groove of the fitting is shaped in such a way that the cross section of the groove essentially corresponds to the cross section of the elevation and wherein the bottom surface of the fitting is configured so that there is a gap between the bottom surface of the rail base.

9. The aircraft of claim 8, wherein the bottom surface of the fitting is configured so that there is a gap between the bottom surface and the rail base.

10. The rail arrangement of claim 1 wherein the elevation top is rounded.

11. The rail arrangement of claim 1, comprising an aircraft seat coupled to said fitting.

12. The rail arrangement of claim 8, comprising an aircraft seat coupled to said fitting.

* * * * *